US006959281B1

(12) United States Patent
Freeling et al.

(10) Patent No.: US 6,959,281 B1
(45) Date of Patent: Oct. 25, 2005

(54) DIGITAL COMPUTER SYSTEM AND METHODS FOR CONDUCTING A POLL TO PRODUCE A DEMOGRAPHIC PROFILE CORRESPONDING TO AN ACCUMULATION OF RESPONSE DATA FROM ENCRYPTED IDENTITIES

(76) Inventors: Kenneth A. Freeling, 29 Wendover Rd., Rye, NY (US) 10580; Daniel E. Geer, Jr., 180 Chestnut St., Cambridge, MA (US) 02139

( * ) Notice: Subject to any disclaimer, the term of this patent is extended or adjusted under 35 U.S.C. 154(b) by 0 days.

(21) Appl. No.: 09/455,823

(22) Filed: Dec. 6, 1999

(51) Int. Cl.[7] .......................................... G06F 17/60
(52) U.S. Cl. .......................... 705/10; 705/12; 705/64; 705/74; 235/51
(58) Field of Search ................ 705/50–52, 64–67, 705/10–12, 74–75; 380/46, 224, 267–268; 235/51–57; 434/306; 379/201, 210; 713/150–162, 164–186; 707/1–10

(56) References Cited

U.S. PATENT DOCUMENTS

| | | | |
|---|---|---|---|
| 5,218,528 A | 6/1993 | Wise et al. ................... | 364/409 |
| 5,615,134 A * | 3/1997 | Newsham et al. ........... | 364/550 |
| 5,671,386 A * | 9/1997 | Blair et al. ................... | 711/5 |
| 5,710,884 A | 1/1998 | Dedrick ................... | 395/200.47 |
| 5,754,938 A | 5/1998 | Herz et al. .................... | 455/4.2 |
| 5,758,325 A | 5/1998 | Lohry et al. ................... | 705/10 |
| 5,860,023 A | 1/1999 | Tognazzini ................. | 395/835 |
| 5,875,432 A | 2/1999 | Sehr ............................ | 705/12 |
| 5,878,399 A | 3/1999 | Peralto ......................... | 705/12 |
| 5,889,935 A | 3/1999 | Ofek et al. ............. | 395/182.04 |
| 5,893,098 A | 4/1999 | Peters et al. ................... | 707/10 |
| 5,970,467 A | 10/1999 | Alavi ........................... | 705/10 |
| 5,974,396 A | 10/1999 | Anderson et al. ............. | 705/10 |
| 6,002,768 A | 12/1999 | Albanese et al. ............. | 380/25 |
| 6,018,717 A | 1/2000 | Lee et al. ...................... | 705/65 |
| 6,021,200 A | 2/2000 | Fischer ........................ | 380/23 |
| 6,021,433 A | 2/2000 | Payne et al. ................. | 709/219 |

(Continued)

FOREIGN PATENT DOCUMENTS

EP    0 647 078 A2 *    4/1995    ............ H04Q 7/28

(Continued)

OTHER PUBLICATIONS

Davis et al., United Sates Patent Application Publication Number US 2001/0035455 A1, Nov. 1, 2001, all pages.*

(Continued)

*Primary Examiner*—James P. Trammell
*Assistant Examiner*—Mary Cheung
(74) *Attorney, Agent, or Firm*—Peter K. Trzyna, Esq.

(57) ABSTRACT

Computer-aided methods (making and using), along with a corresponding machine, article of manufacture, and data structures, is provided for conducting a poll with high reliability to produce a demographic profile corresponding to an accumulation of response data from encrypted identities. The method includes: for each one of a plurality of local computers, carrying out registration substeps of: (i.) receiving an application for Participant registration, the application including Participant identification data and Participant demographic data; and (ii.) if the application is accepted, then issuing respective registration data, including encrypted Participant identification data; thereafter, for a portion of the local computers, carrying out polling substeps of: (iii.) receiving digital signals over the Internet including the encrypted Participant identification data and poll response data for a first question in a poll; and (iv.) responsive to said receiving of said encrypted Participant identification data, preventing more than one respective response to the first question; and associating the encrypted Participant identification data, the response data, and the demographic data, respectively, to produce a demographic profile corresponding to an accumulation of the response data from encrypted identities.

35 Claims, 8 Drawing Sheets

Components of the described system

U.S. PATENT DOCUMENTS 6,081,793 A * 6/2000 Challener et al. ............. 705/50
6,088,722 A * 7/2000 Herz et al. ................... 709/217
6,250,548 B1 * 6/2001 McClure et al. .............. 235/51

FOREIGN PATENT DOCUMENTS

EP 0 723 349 A2 * 7/1996 ............. H04L 9/32

OTHER PUBLICATIONS

Bowers, Diane K, "FAO on Online Research", Marketing Research: A Magazine of Management & Applications v10n4, pp 45-48, winter 1998, ISSN: 1040-8460.*

"Projects and Plans for James Black", James Black, www.eng.usf.edu/~black/projects.html, Mar. 3, 2000, pp. 1-5.

"Design for the Distributed Database", James Black, www.csee.usf.edu/~black/designs/database.html, Mar. 3, 2000, pp. 1-3.

"Design for Voting over the Internet: Protocol on Secure Elections", James Black, www.csee.usf.edu/~black/designs/voting.html, Oct. 5, 1999, pp. 1-5.

* cited by examiner

Components of the described system

Flow chart for new participant registration; Certification Authority side

Flow chart for participant voting; client side

Flow chart for participant voting; server side

Flow chart for processing received polling data; back office

Flow chart for correlating demographic data with polling data

DIGITAL COMPUTER SYSTEM AND METHODS FOR CONDUCTING A POLL TO PRODUCE A DEMOGRAPHIC PROFILE CORRESPONDING TO AN ACCUMULATION OF RESPONSE DATA FROM ENCRYPTED IDENTITIES

FIELD OF THE INVENTION

The present invention pertains to an electrical digital computer machine and a data processing system, methods of making and for using the machine, products produced thereby, as well as data structures and articles of manufacture pertaining thereto, all in the field of computerized aspects of conducting polls, surveys and market research activities (collectively "polling" or "polling activities"). More particularly, this invention relates to a digital electrical data processing system for a process for conducting a poll with high reliability to produce a demographic profile corresponding to an accumulation of response data from encrypted identities. Even more particularly, the present invention involves computer-aided processing and communications over the Internet, for example, with browser-embedded demographic data. The processing includes receiving an application for a participant ("Participant") registration, including Participant identification data and Participant demographic data; and if said application is accepted, then issuing respective registration data, including encrypted Participant identification data to enable subsequent activities with pseudononimous protection of validatable data associated with corresponding demographic analyses.

BACKGROUND OF THE INVENTION

Historically, polling, survey, and market research activities and services have been performed using traditional market research methodologies. These polling methodologies include the use of direct mail questionnaires, telephone surveys, in person interviews, and focus group activities.

Polling activities have broad application. They provide information about opinions, experiences, and attitudes of people around the world to the media, corporations, government authorities, political organizations, groups, and non-profit entities.

Objectives of these polling activities include the delivery of accurate and objective data with low margins of error about preferences, needs, behavior, knowledge, and recognition with respect to the subject matter of a poll and the development of information useful for demographic analyses. This data and information is, in turn, the means by which end points such as approval and satisfaction, advertising, competitive position, product performance, job performance, and price sensitivity ratings can be identified and assessed both in the aggregate and among demographic subgroups corresponding to the Participant population.

Traditional methodologies have practical limitations. The acquisition of polling data is costly, time consuming, generally based on small sample sizes and subject to the influences of interviewer bias. Moreover, consumers of polling information such as the media, political organizations, and corporations are operating in an increasingly competitive environment in which poll Participant preferences may change rapidly and significantly, while at the same time, response rates in connection with traditional polling methodologies are declining. Accordingly, polling assignments requiring large numbers of survey Participants, those requiring quick turnaround times, and those involving sensitive subject matter, may be impractical, may be prohibitively expensive, or may yield results with unacceptably high margins of error.

The Internet offers the potential to revolutionize traditional polling methodologies. Using the Internet, large numbers of Participants may be surveyed rapidly, economically and at the convenience of the Participant. Additionally, the combination of Internet, electronic mail, and database technologies supplies the means for flexible polling and survey systems to target and deliver large numbers of surveys to hundreds of thousands or even millions of Participants quickly and efficiently, as well as to collect and collate responses and perform follow up as needed. Most significantly, these technologies potentially enable the efficient generation of far greater amounts of useful demographic data about Participants to create demographic profiles corresponding to any number of Participant characteristics than might otherwise be feasible using traditional survey methodologies.

However, Internet polling activities, which are still in their infancy, have significant limitations at present. Internet polls often place few or no controls on the number of times an individual user may register to participate in a pollster's Internet surveys or submit a survey response. Nor are there typically controls on the authenticity of the identification or demographic information provided by the Participant. Also lacking are security measures to protect the integrity of the data gen rated by Internet pollsters. In addition, a systematic method to produce a demographic profile corresponding to an accumulation of validatable response data from poll Participants is not in use on the Internet.

Furthermore, potential poll Participants may be reluctant to participate in Internet polls because of privacy concerns. In the important area of political polling, privacy concerns of poll Participants are especially acute.

SUMMARY OF THE INVENTION

A. Objects and Advantages

The objects and advantages of the present invention are:

It is an object of the present invention to provide a computer system that facilitates the reliable collection of opinion information from known Participants;

It is another object of the present invention to provide a computer system that facilitates registering Participants and assigning pseudononimous identities to them once registered that are not deducible from their real identities;

It is yet another object of the present invention to provide a computer system that facilitates collecting opinion information from known Participants without the possibility of double counting;

It is still another object of the present invention to provide a computer system that facilitates collecting opinion information from known Participants without the later possibility of that information being modified either by the Participant or by another;

It is still another object of the present invention to provide a computer system that facilitates information from known Participants without the possibility that a Participant's identity can be matched to his or her poll responses;

It is still another object of the present invention to provide a computer system that facilitates collecting opinion information from known Participants without the possibility that a Participant's identity can be matched to his or her responses except under such circumstances as would require direct and observable intervention by the most senior staff of the polling organization;

It is still another object of the present invention to provide a computer system that facilitates to collect information from known Participants without the need for any specialized facilities on the Participants' premises or computer;

It is still another object of the present invention to provide a computer system that facilitates collecting opinion information from known Participants without the possibility of eavesdropping on the exchange by another party either within the system or without;

It is still another object of the present invention to provide a computer system that facilitates aggregating information from known Participants to be made available to others for a consideration;

It is still another object of the present invention to provide a computer system that facilitates aggregating information from known Participants to be subsetted according to the needs and wants of a purchasing analyst;

It is still another object of the present invention to provide a computer system that facilitates aggregating information from known Participants to be presented to outside parties already processed according to selection criteria of the outside parties' choosing;

It is still another object of the present invention to provide a computer system that facilitates cryptographic keying material that is not used by any other entity but which need not be retained by the system itself; and It is still another object of the present invention to provide a computer system that facilitates collecting opinion information from known Participants without being vulnerable to any single point of failure other than the Internet at large.

B. Summary

A purpose of this invention is to address and overcome such shortcomings of the prior art, for example, by using a digital computer system and an effective method for conducting well-controlled Internet polling activities. Using the computer system and methods, Internet pollsters can eliminate the ability of a Participant to register to participate in a pollster's polls more than once, prevent Participants from submitting more than one set of responses for any given poll, ensure the authenticity of the user's responses, verify the integrity of the Participant's responses, and assure the Participant that neither the pollster nor anyone else can associate his or her personal identity with his or her responses, as opposed to the Participant's demographic attributes, which can be readily tracked and analyzed.

The invention can use public key cryptography and the use of a third party certificate authority to achieve these objectives. While public key cryptography is known in the art, this use for Internet activities is believed to be novel.

More particularly, in accordance with the objects of the present invention, a secured polling system comprises a plurality of access methods comprised of duplicative Internet Service Providers, a plurality of border control points on the exterior of the secured polling system and connected to said plurality of Internet Service Providers, a plurality of load balancing devices connected to said plurality of border control points whereby said poll Responses can be collected at high rates, and a secured database facility connected to said plurality of load balancing devices and from which analytic work can be done without access to the true names and identities of the Participants. In a typical embodiment of the present invention, there is a secured polling system. The Participant(s) is at a web browser capable of the standard confidentiality protocol known as the Secure Sockets Layer (SSL) and has embedded in that browser an identity certificate previously constructed in a registration process having as its sole purpose the construction of this Participant's unique identity certificate. This identity certificate is in the standard format for public-key cryptographically signed identity certificates, the X.509v3 standard. The Participant's web browser has either retained or has access to a so-called Plug-In for digitally signing documents using the private key corresponding to the public-key identity certificate described above.

The computer running the Participant's web browser is connected to the Internet and thence to any of a plurality of collection points on the border of the secured polling system. These border collection points do not modify messages but serve to ensure access to the secured polling system by a plurality of paths hence ensuring the availability of the secured polling system in the face of localized failures of the Internet.

The border devices are connected by reliable means to a load balancing device implemented as a cluster of equivalent processes that accept the SSL connections initiated by the Participants' browsers, i.e., the confidential polling path has as one end the Participant's web browser and as its other end one of the plurality of equivalent and load balanced Response acceptance processes which are within the controlled perimeter of the secured polling system.

The load balanced poll response ("Response") systems connect through means available only to them to the main database of the secured polling system and once a Response has been accepted by the front end and committed to the database on the back end cannot be modified or erased except by exceptional and auditable means such as are available to the data base administration staff out of reach from any public connection to the Internet.

A Participant responding to a poll would connect to the secured polling system via an SSL connection carried over the public Internet. This SSL connection would be initiated by the Participant to a single apparent destination though at the receiving end a plurality of equivalent and load balanced receiving processes would be in use. Once the Participant's web browser had received the identity certificate of the secured polling system and had satisfied the Participant that the Participant had reached the correct secured polling system, the Participant would provide in like manner his or her own identity certificate to the secured polling system and prove his or her identity to it just as it had previously proved its identity to him or her.

Once authenticated in this manner, the Participant would be presented with one or more questions appearing on a poll Response collection screen. Once the Participant has answered the questions, the Participant would cause the screen data to be signed by the cryptographic private key known only to him or her but corresponding to the public key in the Participant's identity certificate. This signing operation takes place on the Participant's own web browser and results in a message ready to send to the secured polling system. If the Plug-In itself conforms to Public Key Cryptographic Standard #7 for digital signature construction (PKCS7) and to its further refinement by the Internet Engineering Task Force (IETF) in the Public Key Infrastructure (PKIX) family of standards the widest percentage of persons with Internet access would be able to participate.

The message is transmitted to the secured polling system by some means such as an HTTP POST operation in accordance with formal standards for the syntax of such messages. This POST operation is effected over the SSL connection between the Participant's web browser and the secured polling system such that no eavesdropper anywhere in the public Internet will be able to learn the content of the Participant's Responses or even the subjects as to which the Participant responded.

At the receiving end said Participant's connection to any of a plurality of load balanced receiving stations will thus be in possession of the completed form in unencrypted form. As soon as the material in the form can be checked for acceptability such as to ensure that the form is not vacuous, the particular acceptance process will commit that public opinion to the database in full. The acceptance machine will return the indication of a successful commit operation to the Participant such that the Participant has an end-to-end assurance that his or her Response was recorded. The connection is then terminated.

The complexity of the polling process is at the receiving end, i.e., the secured polling system itself. The Participant's browser need only be sufficiently modern as to observe the standards known as SSL, X509v3, PKCS7/PKIX, and the semantics of the HTTP POST operation to permit the Participant to respond without specialized means at the Participant's end of the connection. Prior polling systems have required software and means of varying complexity at the Participant's end of the connection or have been so non-standard as to preclude wide applicability necessary and consistent with drawing on the general public for opinion information.

Because of the load-balancing nature of the design including the explicit avoidance of any single point of failure, the secured polling system is not limited by design to any particular capacity or polling rate hence it can be used for opinion sampling on issues of arbitrarily wide intensity and scope.

Because the identity of the Participant is pseudonymous, i.e., because the identity of the Participant is unique but unrelated to his or her ordinary personal identity, the Responses delivered to the secured polling system are free of duplicative Responses, Responses from unauthorized Participants, or the warping of a Participant's expressed opinion by the impact of public disclosure of the Participant's opinion known as bias.

Because the pseudonymous identity of the Participant is nevertheless keyed to such demographic information as was collected in Participant registration, the database of Responses is immediately of value to researchers who wish to explore public opinion not only in the aggregate but segmented by various demographic or other characteristics of the responding Participants.

Because the database of Responses contains none of the material that is required to link a known human individual to his or her Responses, the contents of the database may, in whole or in part, be transmitted to other entities in other locations without any change to the Participant's risk of exposure.

Because the pseudonymity of the Participant's identity removes any barrier to long-term retention of a Participant's opinion, the longitudinal analysis of Participant opinion is enabled, not merely the spot testing of slices of the population.

More particularly, the foregoing can be carried out by a machine (programmed computer) methods for making and using it, products produced by the method, data structures, and necessary intermediates, collectively referenced hereinafter as the method (for the sake of brevity). Accordingly the invention can be illustrated as a computer-aided method for conducting a poll with high reliability to produce a demographic profile corresponding to an accumulation of response data from encrypted identities, the method including: for each one of a plurality of local computers, carrying out registration substeps of: receiving an application for Participant registration, the application including Participant identification data and Participant demographic data; and if said application is accepted, then issuing respective registration data, including encrypted Participant identification data; thereafter, for a portion of the local computers, carrying out polling substeps of: receiving digital signals over the Internet including the encrypted Participant identification data and poll response data for a first question in a poll; and responsive to said receiving of said encrypted Participant identification data, preventing more than one respective response to the first question; and associating the encrypted Participant identification data, the response data, and the demographic data, respectively, to produce a demographic profile corresponding to an accumulation of the response data from encrypted identities.

In any of the embodiments, said polling substeps and said step of associating can be carried out devoid of the Participant identification data.

In any of the embodiments, the method can further include the step of generating a printed report including data generated from the accumulation of the response data and from the Participant demographic data.

In any of the embodiments, the method can further include the steps of generating a report including an extract of some but not all from the group consisting of the accumulation of response data from the first question, an accumulation of response data for a second question, and the demographic data; and storing said extract on memory media to form an article of manufacture.

In any of the embodiments, the method can further include the step of generating a report including data generated from the group consisting of the accumulation of response data from the first question, an accumulation of response data for a second question, and the demographic data.

In any of the embodiments, the method can further include the step of off line generating certificates of authorization as a portion of said registration data.

In any of the embodiments, the method can be carried out with said certificates include a periodic time limit requiring updating said demographic data.

In any of the embodiments, the method can be carried out with said demographic data cannot be modified under Participant control.

In any of the embodiments, the method can be carried out with said steps of carrying out the polling substeps, and said associating the encrypted identification data, the response data, and the demographic data to produce a demographic profile, do not include accessing said Participant identification data.

In any of the embodiments, the method can be carried out such that said step of receiving digital signals over the Internet including the encrypted identification data and data representing the polling data for a first question in a poll is computed asynchronously to computing for said step of preventing more than one response on the question for the corresponding registration.

In any of the embodiments, the method can be carried out such that said step of preventing more than one response on the question for the corresponding registration includes allowing over-writing a prior response.

In any of the embodiments, the method can be carried out such that said step of receiving from one of said computers an application for registration is carried out with said demographic data including a data set of at least three members from the group consisting of residence, age, gender, party, income, and race.

In any of the embodiments, the method can be carded out such that said step of receiving from one of said computers an application for registration is carried out with said demographic data including a data set of at least two members of the group consisting of residence, age, gender, party, income, and race, and said members are verified in determining if said application is accepted, said members verified by checking at least one source from the group consisting of a charge card, a debit card, a bank card, and a drivers license.

In any of the embodiments, the method can be carried out such that said step of receiving digital signals over the Internet including the encrypted Participant identification data is made verifiable by using a public key cryptographically-based digital signature.

In any of the embodiments, the method can be carried out further including the steps of generating a private key and a public key pair, and associating the public key with the demographic data and generating a respective Participant client-side certificate.

In any of the embodiments, the method can be carried out further including the step of cross-certifying an issuer of certificates for Participant authentication.

In any of the embodiments, the method can be carried out such that said substeps of receiving an application for Participant registration, and issuing respective Participant registration data are carried out with a certifying authority computer system; and wherein said substep of receiving digital signals over the Internet is carried out by a politics portal web site, and further including the step of communicating said Participant registration data from said certifying authority computer system to a computer system in communication with said politics portal web site.

In any of the embodiments, the method can be carried out such that said step of receiving digital signals over the Internet including the encrypted Participant identification data and data representing response data includes receiving a response as a signed XML construct providing a pseudononimous identity for carrying out said step of associating the encrypted Participant identification data, the response data, and the demographic data with the pseudononimous identity as the encrypted Participant identification data.

In any of the embodiments, the method can further include the step of disaggregating said accumulation of the response data in accordance with a portion of said demographic data to produce the demographic profile.

In any of the embodiments, the method can further include the step of providing equivalent computer systems for carrying out the step of receiving the digital signals over the Internet, said equivalent computer systems communicating to form the accumulation of response data.

In any of the embodiments, the method can further include the step of receiving digital signals over the Internet from a Participant including signals triggering a voiding of the corresponding prior response data for the first question in a poll.

In any of the embodiments, the method can further include the step of encrypting a database formed by carrying out said step of associating.

In any of the embodiments, the method can further include the step of forming a data structure mapping a database formed by carrying out said step of associating, said data structure mapping the database to consistently form a pattern of data types.

In any of the embodiments, the method can be carried out such that the step of issuing respective registration data, including encrypted Participant identification data, includes issuing a schema including said Participant demographic data.

In any of the embodiments, the method can further include the step of providing multiple electronic pathways for carrying out the step of receiving digital signals over the Internet.

In any of the embodiments, the method can further include linking a remotely mirrored logging facility to a host computer carrying out said step of receiving of said encrypted Participant identification data; and providing said host computer with redundant power and redundant Internet feeds.

Accordingly, and based on the further disclosure herein, there is a secured polling system comprising: a means for a Participant to record his or her opinion; a means for said Participant to be uniquely identified while responding to a poll; a means for said Participant's opinion to be transmitted to and received at a distant location; a means for aggregation, disaggregation, and dissemination of the opinions of a plurality of said Participants such as for presentation to others; and a means to guarantee integrity throughout said polling process.

In any embodiment herein, the invention can be carried out such that said Participant records an opinion over an active electronic connection.

In any embodiment herein, the invention can be carried out such that an active electronic connection is encrypted whereby the Participant's opinions are protected against eavesdropping as would disclose said Participant's opinions, identity, or both.

In any embodiment herein, the invention can be carried out such that said Participant Responses are provided under an electronic polling identity unrelated to said Participant's identity as a particular human being.

In any embodiment herein, the invention can be carried out such that a unique identity of said Participant is securely coupled to other information related to said Participant.

In any embodiment herein, the invention can be carried out such that a Participant's said electronic polling identity is coupled to said other information related to said Participant by a digitally signed document containing both said Participant's said electronic polling identity and said other information related to said Participant whereby said Participant will provide the entirety of said other information when said Participant presents the said document to establish said Participant's identity before responding to a poll.

In any embodiment herein, the invention can be carried out such that a Participant's said electronic polling identity is coupled to said other information related to said Participant by a digitally signed document containing said Participant's said other information related to said Participant and said Participant's electronic pseudononimous identity only where by said Participant's said other information might be modified as conditions require without the necessity of reissuing said Participant's said electronic polling identity.

In any embodiment herein, the invention can be carried out such that a unique identity of said Participant is impossible to electronically forge.

In any embodiment herein, the invention can be carried out such that a Participant's said opinion cannot be modified once entered into said system.

In any embodiment herein, the invention can be carried out such that said Participant can nevertheless void said Participant's said opinion once entered into said system.

In any embodiment herein, the invention can be carried out such that there is a plurality of electronic pathways by which said Participants may connect to the said secured polling system whereby the availability of communication to the said secured polling system is thus assured.

In any embodiment herein, the invention can be carried out such that there is a plurality of equivalent subcomponents of said system such that each said equivalent subcomponent is capable of receiving a Participant's opinion independently of all other subcomponents whereby the availability of registering said Participant's opinion with the said secured polling system is thus assured.

In any embodiment herein, the invention can be carried out such that said means for aggregation comprise a database to which said Participants' opinions are committed.

In any embodiment herein, the invention can be carried out such that said means for aggregation comprise a secured database wherein no unauthorized access from a location other than the secured polling system or by a person other than an authorized person at the location of the secured polling system is possible whereby the integrity of the said Participants' opinions in said secured database are thus assured.

In any embodiment herein, the invention can be carried out such that all information in said database is encrypted whereby theft of the database in whole or in part will not reveal any of its contents.

In any embodiment herein, the invention can be carried out such that said disaggregation and dissemination of the opinions of a plurality of said Participants comprises a facility to subset said opinions by the values of any collection of values as found in said other information related to said Participants in particular and in the aggregate whereby the opinions of subsets of said Participants can be characterized by any value or set of values found in said other information.

In any embodiment herein, the invention can be carried out such that said Response of said Participant is encoded so as to be self-describing by not requiring a database schema to interpret said Response.

In any embodiment herein, the invention can be carried out such that said self-describing Response by said Participant is digitally signed by said Participant as a unit whereby said Response can later be authenticated by other parties as a whole Response cast by said Participant.

In any embodiment herein, the invention can be carried out such that said self-describing Response by said Participant and said Participant's other information are digitally signed by said Participant as a unit whereby said Response and said Participant's other information can later be authenticated by other parties as a whole Response cast by said Participant as described by associated with said Participant's said other information. Another way of viewing the invention is as method for high reliability communication of demographic data from encrypted identities, the method including: (i.) certifying, by computer, a plurality of respective registrations by substeps including: receiving a plurality of respective Participant registration applications including respective Participant identification data and Participant demographic data; and for any respective one of said applications accepted for authorization, issuing respective registration data, including: encrypted Participant identification data and encrypted Participant demographic data; and (ii.) using, by computer, said registration data in substeps of: respectively receiving said registration data and query-responsive digital signals; and associating, by computer, said registration data and said query-responsive digital signals in producing an accumulation.

In any embodiment herein, the invention can be carried out such that said issuing respective registration data includes issuing respective registration data as an electronic message for storing in a browser or in memory of a smart-card.

DETAILED DESCRIPTION OF A PREFERRED EMBODIMENT

Figure 1:
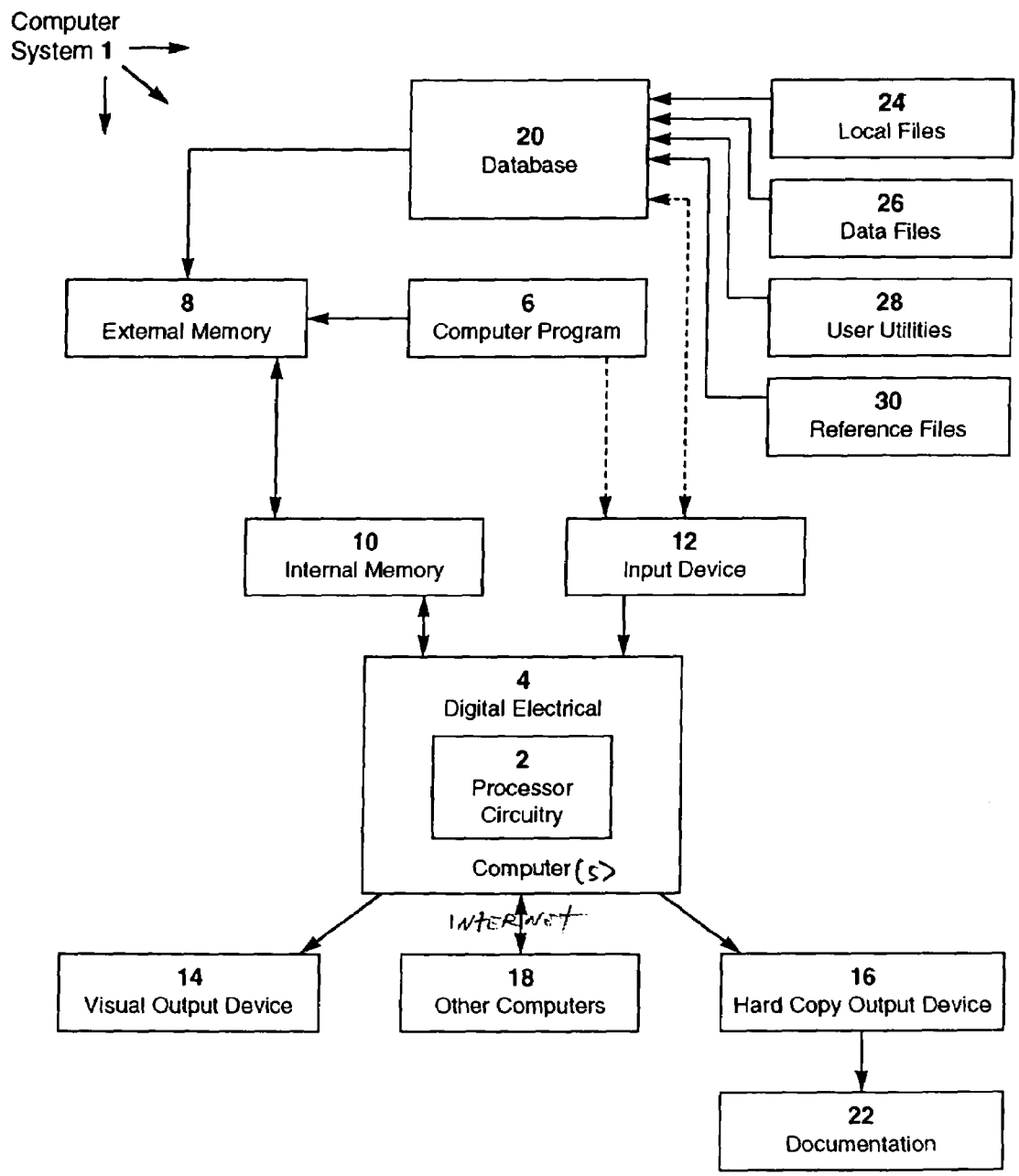
FIG. 1 is an illustration of an embodiment of the present invention focussing on hardware features.

As an overview of the system, the initial embodiment is an engine initially configured to be used in conjunction with a web site pertaining to government, politics and the law (a "Politics Portal") in which polling activities related to these subjects are regularly conducted. The secured polling system disclosed herein is not, however, limited to this particular embodiment. The secured polling system is equally useful for any type of commercial polling, survey or market res arch activities. For the remainder of this discussion, such subsequent uses have little bearing except where constraints that might prove limiting in some regard.

At this web site, Participants sign on in some controlled way and answer one or more questions constituting an online poll, with lockout for duplicative attempts to respond to a poll and strong resistance to impostoring, write over capability for Participants who change their mind, or Response cancellation (wipe the data record) alternatives.

When prospective Participants register for the credential that later allows actual access to/through the portal, they will provide a (potentially large) number of fields of demographic information that would later be used to craft reduced dimensionally poll results across the retained demographic information. This data reduction will produce intelligence of commercial, political and academic value.

Throughout the lifetime of an individual's interaction with the polling process, the identity of the individual Participant is and must remain disassociated from the demographic information in a way that fully serves to assure users of privacy protection. This mechanism must withstand external audit so as to further the aim of user comfort and protection by third party endorsement.

Our idea is to build a system that provides the above service subject to representative requirements and constraints. Such a system should be as generic as possible for flexibility purposes.

Definition of Terms

Highly Available—low/no latency to recovery from failure;

Non-Stop—does not fail;

Signature—digital signature as conventionally understood within a PKI;

PKI—public key infrastructure, the entire apparatus of key management;

XML—extensible Markup Language, an evolving Internet standard;

IETF—Internet Engineering Task Force, Internet standardization body;

Vote—one authenticated unit of voting, polling, etc.;

CA—Certifying Authority, that which signs user/voter credentials;

CRL—Certificate Revocation List, an enumeration of certificates gone bad.

Representative Requirements

R01: System prevents impostoring by the Participant;

R02: System prevents Response tampering by insiders;

R03: System prevents assembly of name/demographic data pairs in full;

R04: System prevents unauthorized Participant edits of demographic data;

R05: System has no failure modes that expose private data;

R06: System is highly available;

R07: Responses are self describing;

R08: Response delivery preserves confidentiality and integrity;

R09: Duplicative attempts to respond to a poll are detected and blocked or controlled (e.g., write over and erase);

R10: Aggregated polling data can be subsetted in any permutation;

R11: Deployed system version 1.0 handles 50,000 Responses/day;

R12: Management operations are only available in the back office.

Representative Constraints—System Forbidden to do These Things

C01: No client side software beyond browser ready for client-side certifications;

C02: Cryptographic keys for polling are not used elsewhere;

C03: Responses, once delivered, may be voided but not erased;

C04: Participant Back Office computer does not issue or retain private keys;

C05: No single point of failure other than full failure of the Internet.

Representative Non-Requirements (Possible desirables which can be included in the present embodiment)

NR01: Full location independence for repeat visits by voter;

NR02: Non-stop processing;

NR03: Total hands-off operation.

Representative Other Main Points

Public-key cryptographically based digital signature is inherent throughout this design. In particular, the intuitive formality accorded to black ink on bond paper is re-created here with electronic means.

The first implementation is one that allows for later upgrade addressing scaling and reliability issues that exceed R11 above.

(1) A Response is a signed XML construct, i.e., the scope of what is signed is itself expressed in XML signed as a unit such that individual data items are both self-describing and cannot later be confused as to what their set membership is. The signature is verifiably connected with the polling name but that polling name is a pseudononimous identity thereby satisfying R03, R05, and R07. As such, the process by which a Response is submitted is independent of the form of the Response and yet the Response has authenticity and integrity.

(2) The (initial and preferred) polling operation will be via on-screen form fill-out over an SSL link to the data center in the standard Web-based "Application Service Provider (ASP)" style. In particular, the form will include unique identifiers that would later be used for self-check purposes, and it is possible to have a front end (CGI) data processor to accept the input (HTTP POST) operation at the completion of forms fill-out, protected of course from all the ordinary attacks on forms (such as Participant modification of hidden data fields). This on-line nature of the system meets R01, R05, and R08 while observing C01.

(3) The Participant's signature will be made in the private key half corresponding to the public key half contained in the Participant's client-side (identity) certificate. This signature operation will require availability of that private key half—which should not be widely available, consistent with security principles and with C02. The preferred mechanism for this is a competent web forms package with a plug-in to handle signing operations, i.e., meeting R01 and R02 while observing C04 as well as C02 mentioned above.

(4) Certification Authority computer will either have to provide a certification mechanism, i.e., a Certifying Authority (CA), or it will have to cross-certify certificates already in possession of the Participant (in violation of C02, however). Because the cost of PKI is largely due to the costs of securely enabling stranger-to-stranger authentication not involving the certificate issuer—a precondition that does not here obtain—it is dearly preferable for the Back Office system to provide a limited functionality CA. Procedurally, this will be incorporated in that same semi-manual processing (per NR03) that establishes the identity relationship between Back Office System and the Participant, i.e., where a pseudonymous polling credential is issued to an otherwise known individual. If the certificates used in the system are purely reflexive, i.e., the only use to which they are put (once issued) is in a communication path leading back to the issuer, revocation of these certificates becomes a trivial non-issue quite unlike that problem as seem from a general purpose CA or those who depend upon it. This satisfies R01, R03, and R04 while observing C02 and C04 (the latter does presume client-side key generation). Because the issuing CA is permitted to be off-line, occasional service outages will be permitted for the new-Participant-registration process, but not for the polling process as detailed elsewhere.

(5) The identity of the Participant will be made pseudonymous in all regards except that of initial registration and certificate issuance. The personal identity will be only kept off line and will be consulted only to prevent repeat issuance of duplicative credentials to the same individual. This will serve both to prevent leakage of personal information as per R03 and R05 as well as to permit sealing the demographic information into the client certification by signature of the CA thereby meeting R04.

(6) When received, a Response is committed to the database by simply reading out the demographic attributes in the client certificates and the data items in the XML encoded form signed with the private key corresponding to that certificate, on the condition that the signature is valid. The raw data as received will be committed to a log so as to meet R02; in fact, the log of received information will be itself sufficient to regenerate the database in full should occasions require, contributing to R06 while observing C03. If database extracts are to be sold to others, these sub-databases will be generated from the log subject to whatever filter that customer would want applied, thereby precluding inadvertent copying of the entire database as is and contributing to R05.

(7) The level of freshness required for the demographic data, such as to check annually that zip code or family income were as represented in the identity certificate will set the lifetime of issued certificates. In no case will the customer be able to modify his or her record, as that would imply secure access to non-pseudonymous identity.

(8) Duplicate Response detection will be a process run asynchronously from the Response collection process so as to remove wait-states on data capture, consistent with R09. The preferred strategy will be to over-write a prior Response with a subsequent Response with a flag bit set to indicate re-submission. By making the Response an over-write, a failure to process duplicative Response detection fails by simply permitting re-polling rather than by permitting ballot stuffing contributing to the observance of R05 as well.

(9) The form of the database system will be simply that which can tolerate the load, i.e., the product of the number of Responses, the number of Participants per Response, and the number of analysts working these issues. The capacity of today's commercial off-the-shelf database systems is unlikely to be exceeded in early operations but competent database administration and design talent will be consulted early to confirm such claims. The back-end statistical processes will be handled by the usual suspects in data analysis with the simple caveat that the database system and the statistical analysis system will be chosen such that their output can be input to other systems on other days, such as SAS data set formats and SQL query systems to pick obvious examples. The satisfaction of R10 is very nearly inherent in making the choice of database and statistics packages, per se.

(10) Demand estimation for version 1 of the system is 50,000 Responses per day or about 1 Response every 2 seconds, as codified in R11. In no case will the submission of any Response pass through a single point of failure, as per C05, but this pair of R11 and C05 collectively dictate a full redundancy model of the sort most easily achieved at a dedicated hosting center closely linked to major peering points on the Internet itself. Because the use of such a facility is anticipated, environmental conditions such as redundant power feeds from differing grids, redundant Internet connectivity from differing ISPs, backup systems with off-site archiving and regular data-recovery drills, and machine-room surveillance, have not been enumerated.

(11) The configuration and management of the system will be over dedicated links, i.e., there will be no opportunity for management changes to the system to take place over any channel involved in polling. In particular, a management net will connect the various parts of the back-office and the management sub-system will be available only on this management net. Whether this management net is fiber-extended to a remote location (with suitable link encryption) is immaterial so long as management is isolated as indicated by R12 and, to a less extent, R05.

Facilities at Each Site

At Participant's Desktop

Standard web-browser capable of client side certificates, including
Facilities to perform key generation, supporting a
Plug-in to sign a form, all behind a
Firewall configuration that permits SSL connection to the Back Office System.

At Response Processing and Back Office Systems

Facilities at Participant, plus a
Small-scale CA generally in offline mode, and its corresponding
CRL publisher aligned with all CA operations;
Redundant power and Internet feeds;
Load balancer receiving the above and pointing to
Redundant SSL-capable web servers, each with
CGI scripting to handle HTTP POST operation, and loaded with
Signed forms for each potential polling scenario;
Non-tamperable, remotely mirrored logging facility separately from a
Competent database system with standard query language support, plus
Statistical package(s) consistent with the above;
Self-test facilities with suitable alarms;
Duplicate Response detection process with flagging and self-overwrite;
Perimeter control and overall intrusion detection system, wrapped around
High-availability platforms backed with disaster recovery facilities Later implementations might convert some of the Non-Requirements into Requirements. The biggest challenges are in total system reliability rather than cryptographic fine points. Split-key cryptography would remove the on-line assumption in the form fill-out but current practice seems to be running strongly towards fully online presumptions and thus NR01 will likely never become a requirement. Signature by the client may not itself be needed if the back office assumes all liability for the prevention of the entry of duplicative poll Responses by a Participant, Participant fraud, insider abuse, etc., as that would imply rather conventional data-center integrity control if coupled with a fully on-line assumption, though taking that approach would preclude some kinds of audit now thought valuable such as to be able to prove the completeness and integrity of a single polling record.

FIG. 1 shows, in block diagram form, the computer-based elements which can be used to implement the present invention. The present invention involves computer system 1, which includes processor circuitry 2 in a digital electrical computer 4. For flexibility, it is preferable to have the processor circuitry 2 formed by means of a computer program programming programmable circuitry, i.e., programming the computer (processor). The programming can be carried out with a computer program (or programs) 6, which for flexibility should be in the form of software stored in an external memory 8, such as a diskette, hard disk, virtual disk, or the like. (The virtual disk is actually an extended internal memory 10 which may assist in speeding up computing.) A diskette approach is optional, but it does provide a useful facility for inputting or storing data structures that are a product produced by the host software, as well as for inputting a software embodiment of the present invention. Storing the computer program 6 in a software medium is optional because the same result can be obtained by replacing the computer program in a software medium with a hardware storage device, e.g., by burning the computer program 6 into a ROM, using conventional techniques to convert software into an ASIC or FPGA, etc., as would be understood by one having a modicum of skill in the arts of computer science and electrical engineering. (It is well known in the art of computer science that it is a trivial technical exercise to go from hardware to software or vice versa. See, for example, James R. Goodman, Todd E. Marlette, and Peter K. Trzyna, "The Alappat Standard for Determining That Programmed Computers are Patentable Subject Matter," J.P.T.O.S. October 1994, Volume 76, No. 10, pages 771–786, and James R. Goodman, Todd E. Marlette, and Peter K. Trzyna, "Toward a Fact-based Standard for Determining Whether Programmed Computers are Patentable Subject Matter," J.P.T.O.S. May 1995, Vol. 77, No. 5, pages 353–367, both of which are incorporated by reference.) In this regard, it should also be noted that "input" could include inputting data for processing by the computer program 6 or inputting in the computer program 6 code itself.

An internal memory 10 works in cooperation with the external memory 8. An input device 12 could include a keyboard, a smartcard reader, or equivalent means for a user to input the data discussed below. A visual display unit 14 can be employed for a visual representation, and a printer 16 can be employed for producing hard copy output 22. Note that output electrical data can also be stored to memory 8.

For such an embodiment, the following specification should operate satisfactorily: an IBM or compatible PC (type XT or upwards) computer with a 386 or higher processor, having at least 640 KB of memory (RAM). The environment/operating system could be MS-DOS/PC-DOS (or equivalent) version 3.0 or later. A numeric (math) co-processor is also advantageous in speeding up computing times, as is an extended memory. Alternatively, a Windows implementation could be used. The input device 12 can be any ANSI standard terminal, and the visual display unit 14 can be a Trinatron color monitor.

Still other alternatives include using a network of other computers 18 or a mini-computer or a mainframe system. With such larger scale approaches, the external memory 8 could be a tape or a CD ROM for data retrieval. A Solaris server running Oracle 8 is an acceptable approach.

As indicated above, an embodiment could also be carried out in hardware, though this is not recommended, as it is an inflexible approach. Accordingly, a hardware implementation is described here for exemplary purposes. Of course it is well known that a computer program can be stored in hardware by many approaches, not the least of which is burning it into a ROM. More sophisticated than burning a ROM, but also entirely conventional, is to use techniques to translate the computer program 6 into an ASIC or a chip that will carry out the invention in an equivalent manner, and if in fact with equivalent circuitry to that formed by programming programmable computer circuitry. So, for example, a certificate and/or demographic data—registration data—can be in a memory device in a smartcard, a chip or the like in a smartcard, in software on a brows r, or some equivalent—it is all just digital electrical circuitry processing digital electrical signals, transforming them to output different electrical signals. In use, the Smartcard substitutes for the local computer 4 as a place to store the "private key" which is the only real secret in the system. As a security matter, this is an improvement as the user can walk away with his or her secrets in his or her pocket. As a matter of user convenience, the user is no longer tethered to a particular desktop and can instead be more or less anywhere, and need not rely on the local machine to be competent.

The present invention can best be implemented by utilizing a database 20 of files (or an equivalent, e.g., records, a relational database, etc.) pertaining to insurance documentation data for processing as discussed herein. In FIG. 1, respective dotted lines between database 20 and input device 12, and between computer program 6 and input device 12 illustrate that the computer program 6 and contents of database 20 can be obtained from data input at the input device 12, which converts the respective input data into respective electrical signals for handling by the digital electrical computer 4, and processor 2, including storing the respective digital electrical signals in the memories 8 and 10. Output electrical data, in the form of digital electrical signals, is generated by the processor 2 processing the input electrical data in a manner specified by the executable program 6, such that when operated, the system 1 as a whole produces a tangible presentation, such as that represented in FIG. 1 as documentation 22.

There can be five basic types of file or data stored in the external memory 8:

1. The main program file (i.e., computer program 6).
2. Local files 24 (files specific to a particular user and not available to other users). These include files describing the configuration of the user's preferred output format, private dictionary files, input and output files generated by the user, etc.
3. Data files 26 local to a user, which in a single computer system would include the main database file.
4. User utilities 28, which assist in customizing reference files and in the creation of private dictionaries.
5. Reference files 30, which are accessible to all users (e.g., users of other computers 18) and include the standard (or "public") dictionary files, files containing the menus, error and information messages and prompts.

If the invention is carried out with one computer and used by one user, reference files 30 are kept along with local files 24. In any case, a user should have access to the files that include the above-referenced insurance documentation.

The programmed processor circuitry 2 uses the contents of files 24–30 which represents some or all of the data input by the user to produce output data in a digital electrical form of a string of bits, which correspond to, processed data. The processor circuitry 2 carries out its operations by using at least one "filter", which can be characterized as an analysis or process restricted by a precise definition. Elements of the definition can be characterized by at least one logical operator or operand to indicate the precise definition or process to be carried out, e.g., whether the union or intersection of two elements or the complement of an element is required. The term "filter" is also applied to the process of applying this definition to change, create, or generate, or exclude data other than that defined from subsequent processing.

This invention can also be implemented by utilizing at least one pointer to insert a computed piece of data into the preformatted text of the above-referenced documentation in the appropriate data file(s). Alternatively, a plurality of pointers can be logically linked so that the output electrical data can be inserted in a plurality of locations in the aforementioned documentation 22. The computer program 6 controlling the digital electrical computer 4 checks for the pointer(s) to ascertain whether any electrical output data should be inserted in generating the insurance documentation 22. This is preferable to an computed amounts on printed documentation preformatted to accommodate the inserted amounts.

Figure 2:
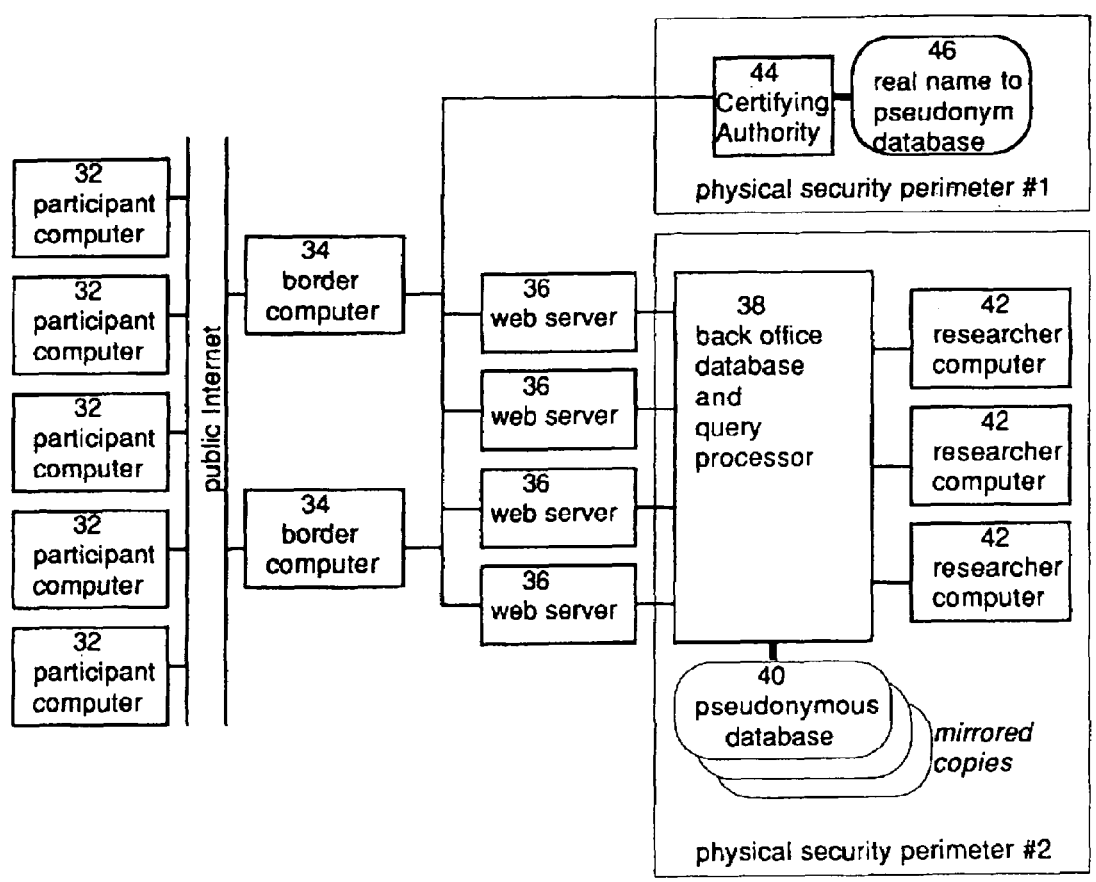
FIG. 2 is an illustration of the embodiment of the present invention also focussing on hardware features.

FIG. 2 illustrates components of the System 1. A plurality of Participant Computers 32, corresponding in FIG. 1 to Computer 4, such as a Pentium-based IBM compatible (with a browser) and denoted 32 are connected wherever they may be to the Public Int met and thence to a plurality of Border Computers 34 such as Cisco Local Directors. These Border Computers 34 serve to balance load and to ensure sufficient redundancy so as to permit the failure or overloading of any one to represent no service outage as seen from the Participant Computers 32.

The internal network behind the Border Computers 34 includes both Web Servers 36 for the purpose of polling and as well as a Certifying Authority Computer 44. The Certifying Authority Computer 44 is housed within a physically secure room and is accessible only by networking equipment. With the Certifying Authority Computer 44 is the Database 46, which holds the real names of Participants and the pseudononimous identity assigned respectively to them. This Database 46 is also within the same physical security perimeter as the Certifying Authority Computer 44 and has no external accessibility except via the Certifying Authority Computer 44, and then only indirectly.

This invention enables a politics portal, ("portal") in that it enables a virtual location on the public Internet where news, search, directory, and membership are arranged, and "politics" inasmuch as the expression of diverse opinion is enabled by the availability of portal services. In particular, the expression of opinion correlated with enough other information to be meaningful but not so much as to stifle legitimate expression of differing views is aided by the present invention.

Figure 3:
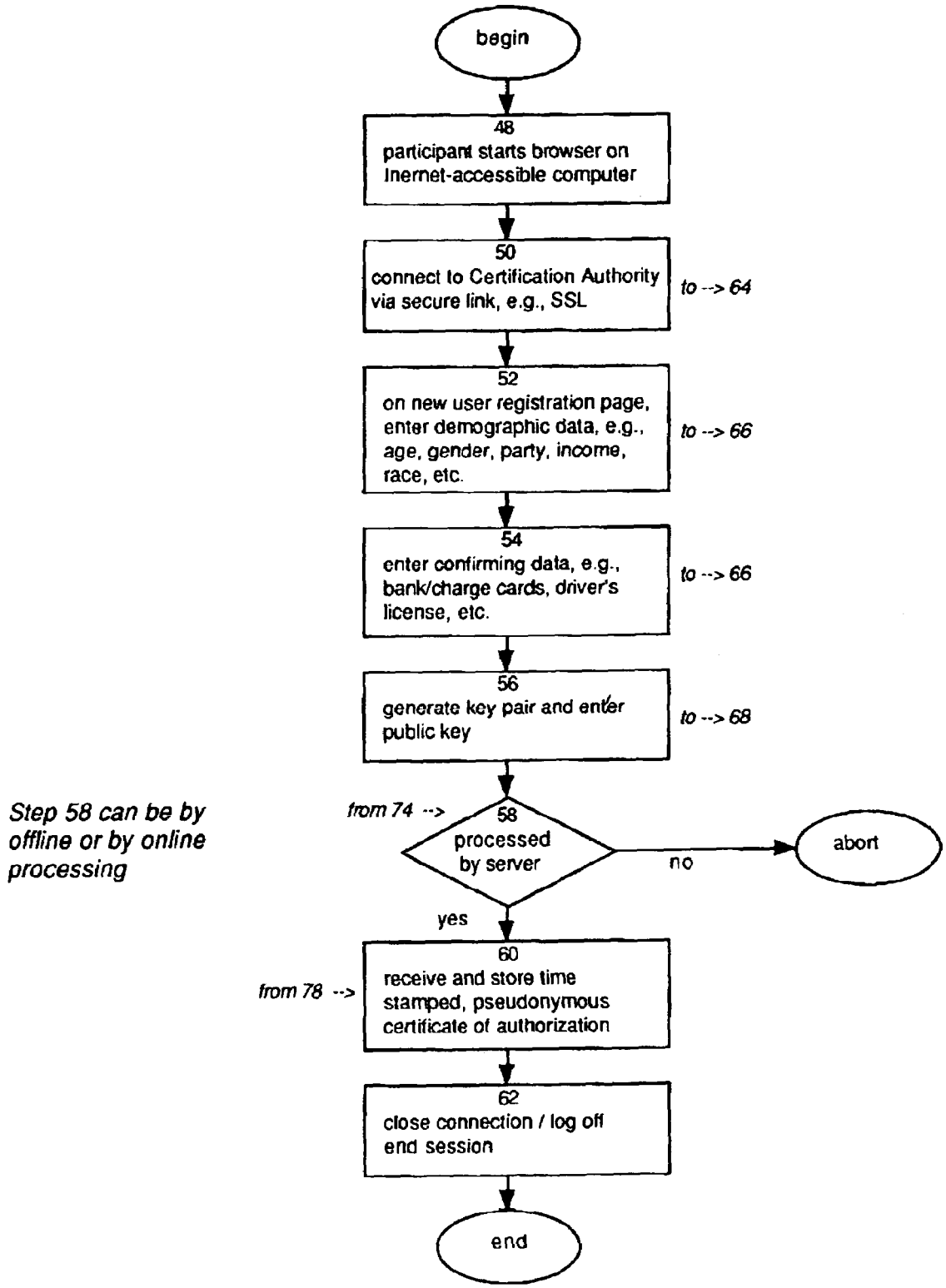
FIG. 3 is an illustration of a flow chart for an embodiment of the present invention.
Figure 4:
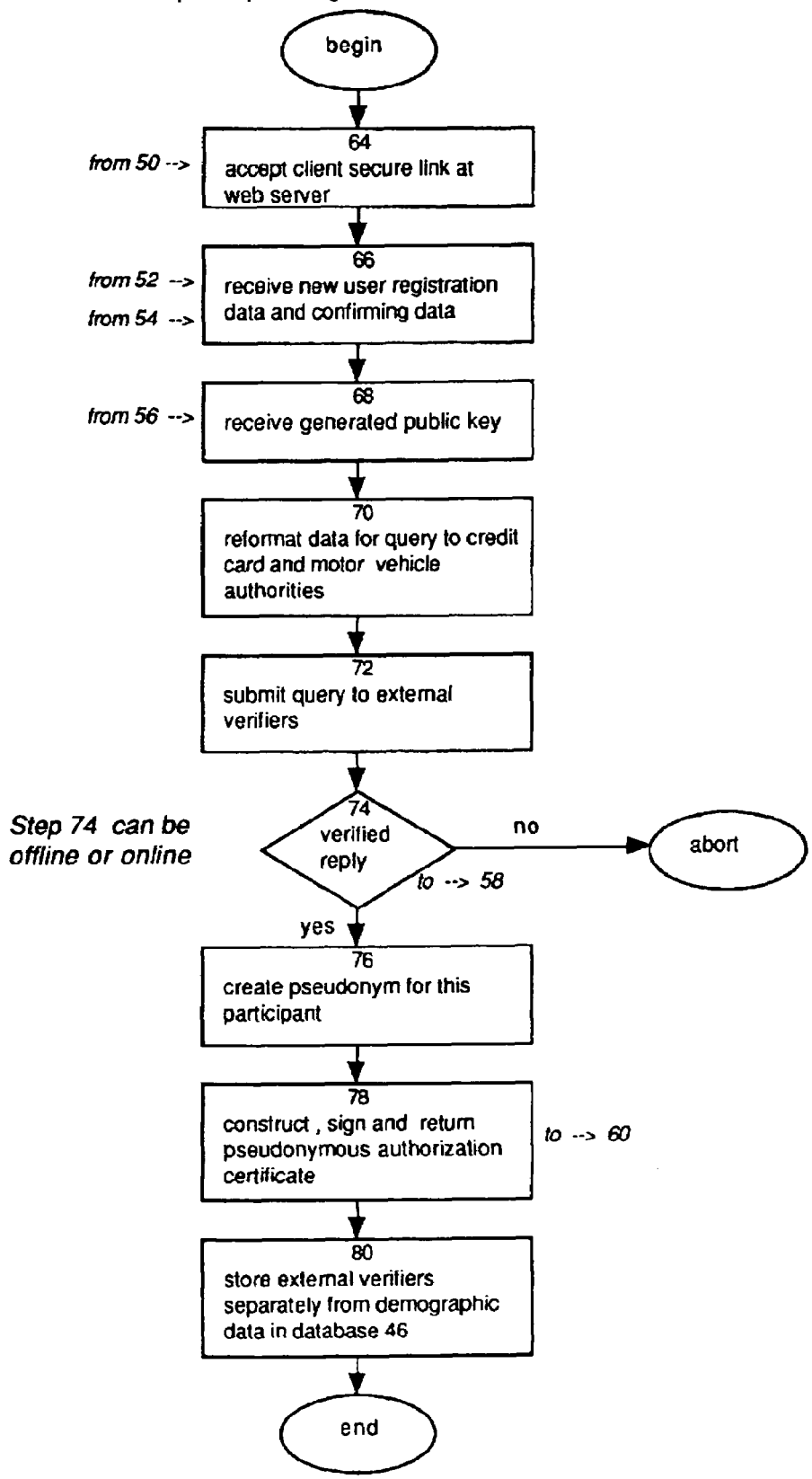
FIG. 4 is an illustration of a flow chart for an embodiment of the present invention.

See FIGS. 3 and 4 for a description of the interaction between the 1 Participant Computers 32, the Certifying Authority Computer 44 and the real name to Pseudononimous Identity Database 46 by way of the Public Internet and the Border Computers 34.

The Web Servers 36 for polling are redundant in number both for load balancing and for failure avoidance. Each of them is capable of the complete interaction with a multiplicity of single Participant Computers 32. Each of the Web Servers 36 will accumulate the credentials and the Responses from a multiplicity of Participant Computers 36 and will forward these on to the Back Office Database and Query Processor 38 when possible to do so. In this manner the collection of Responses is not constrained by the availability of the Back Office Computer 38 nor does Participant Computers 32 have any reason to wait for processing, such as while the Back Office Computer 38 determines if the particular Response is a fresh one or a replacement to be overwritten on a previous Response.

Figure 5:
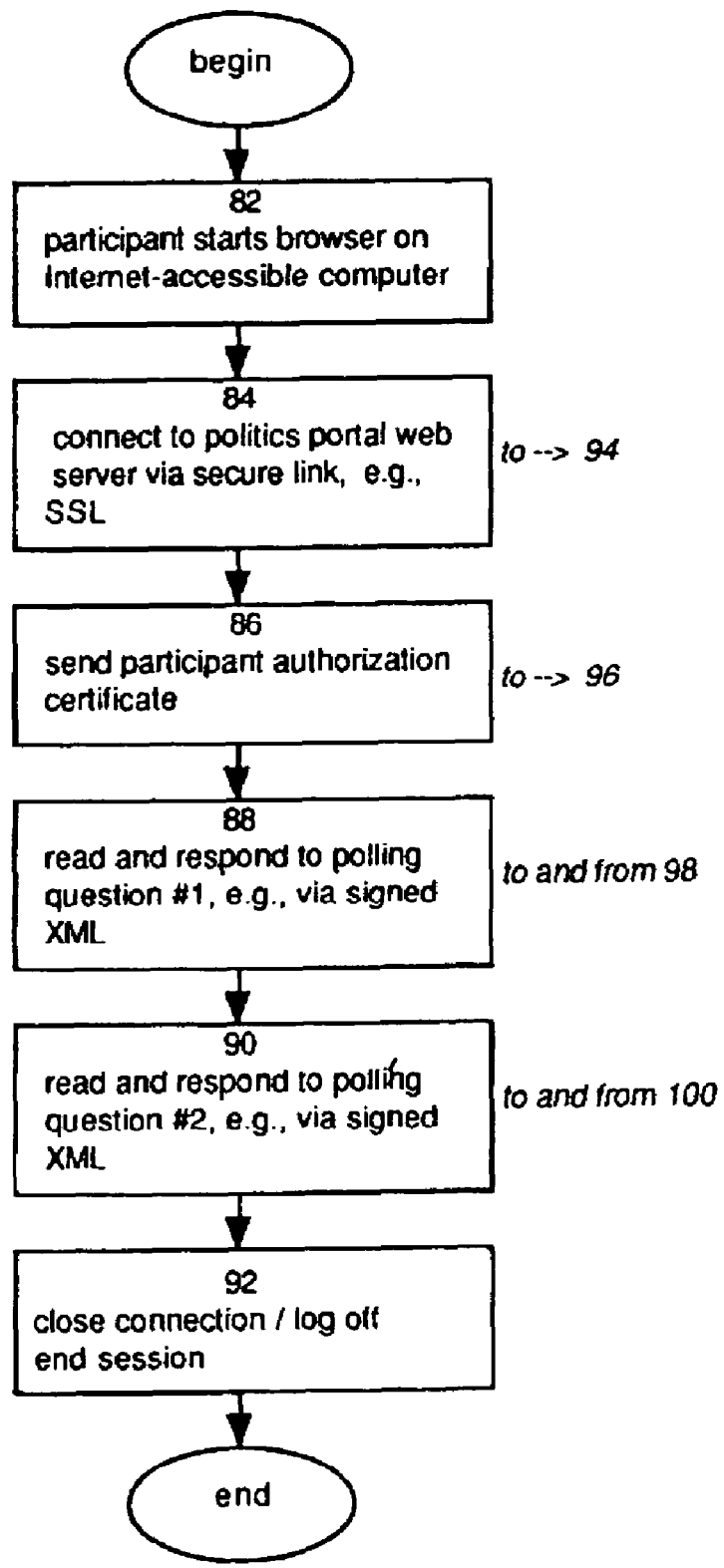
FIG. 5 is an illustration of a flow chart for an embodiment of the present invention.
Figure 6:
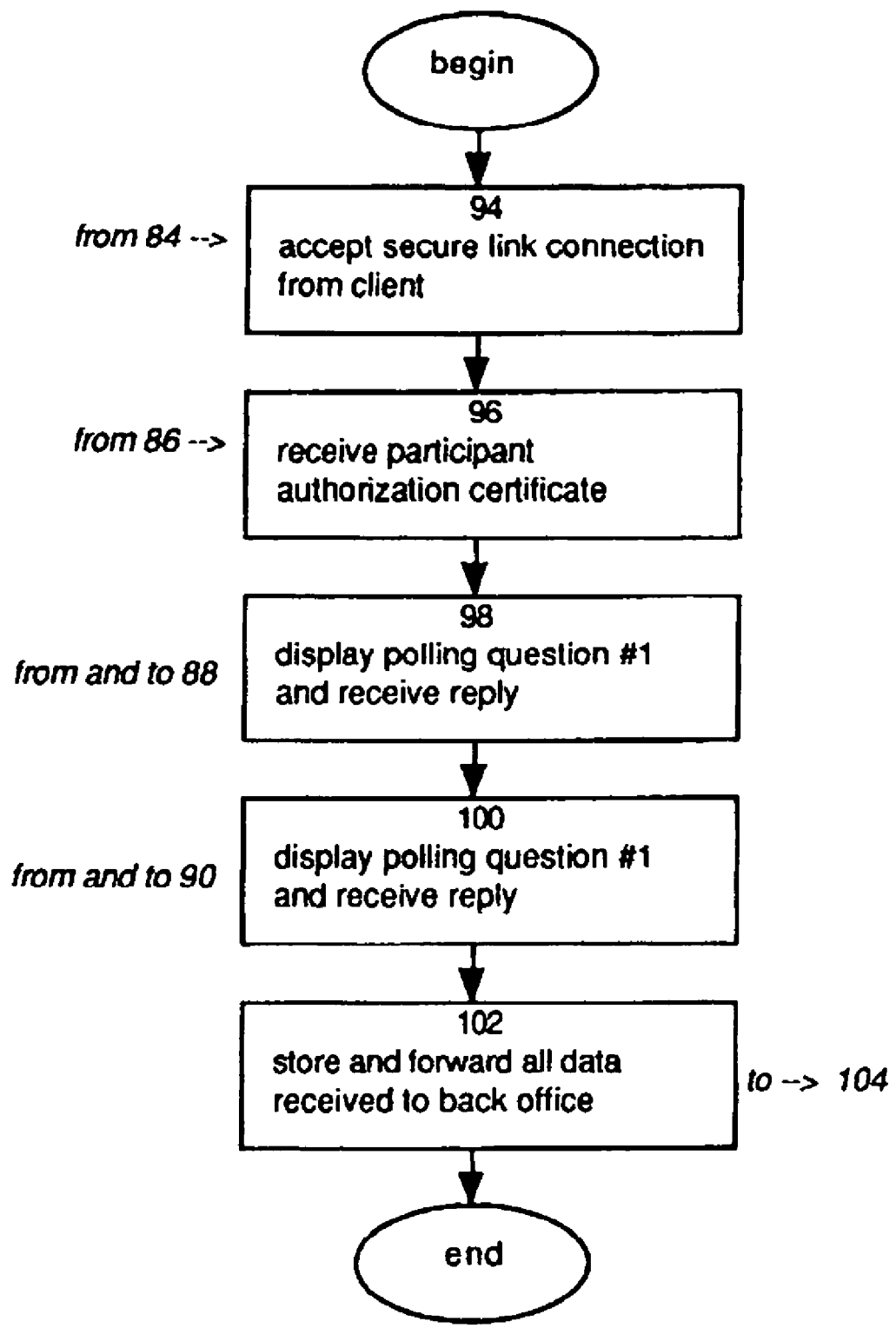
FIG. 6 is an illustration of a flow chart for an embodiment of the present invention.

See FIGS. 5 and 6 for a description of the interaction between the Participant Computers 32 and the Web Servers 36 for polling by way of the Public Internet and the Border Computers 34.

The Back Office Database and Query Processor 38 has connected to it the actual Pseudonymous Polling Database 40 in which Responses are tallied in the aggregate. The Back Office system 38, the Pseudonymous Polling Database 40 and a plurality of Researcher Computers 42 are all contained within a second but distinct secure facility such that only by a network connection or by the direct physical presences of an authorized researcher can the records contained in the Pseudonymous Polling Database 40 be obtained, abstracted, disaggregated, accumulated or otherwise analyzed.

Figure 7:
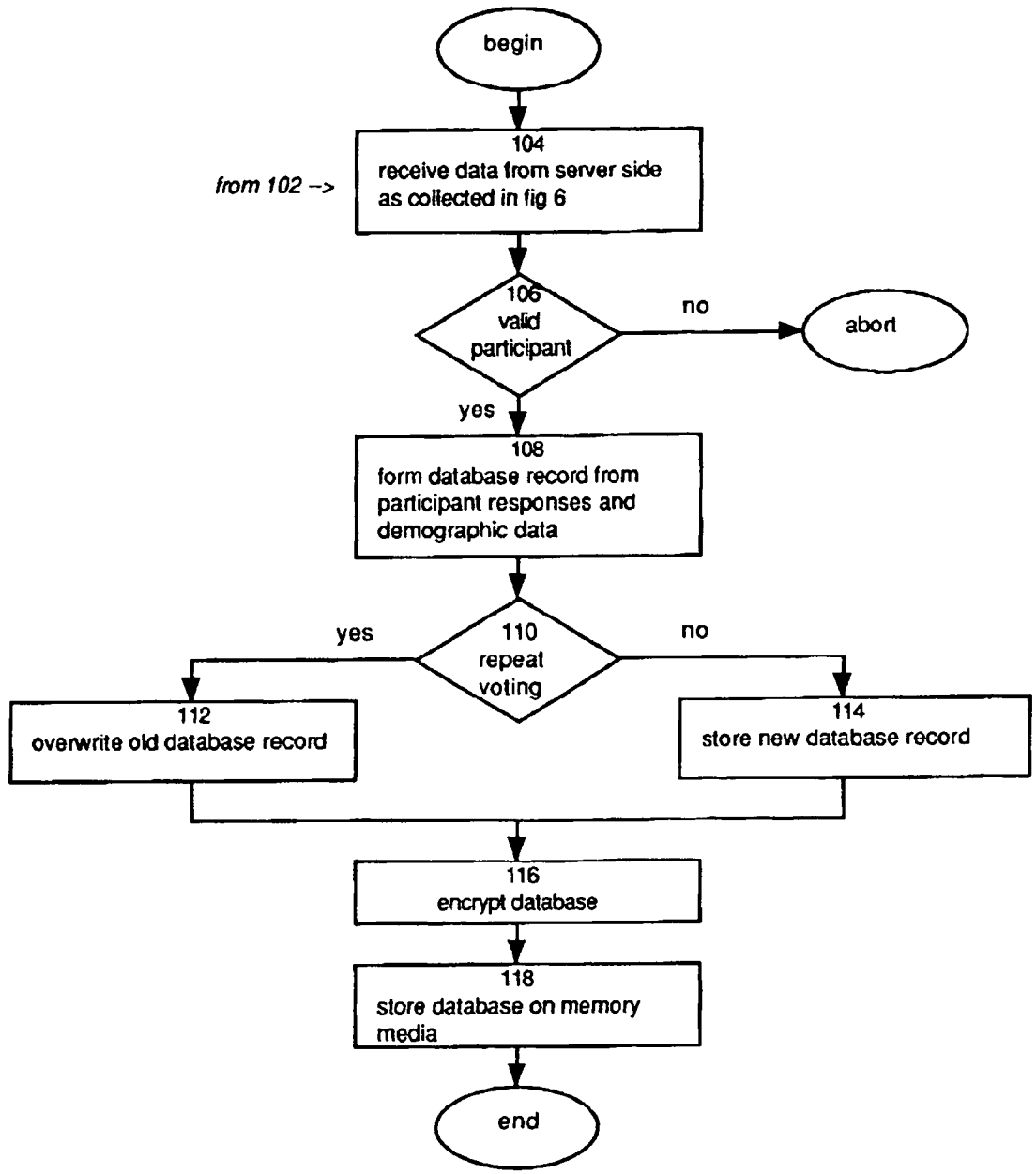
FIG. 7 is an illustration of a flow chart for an embodiment of the present invention.
Figure 8:
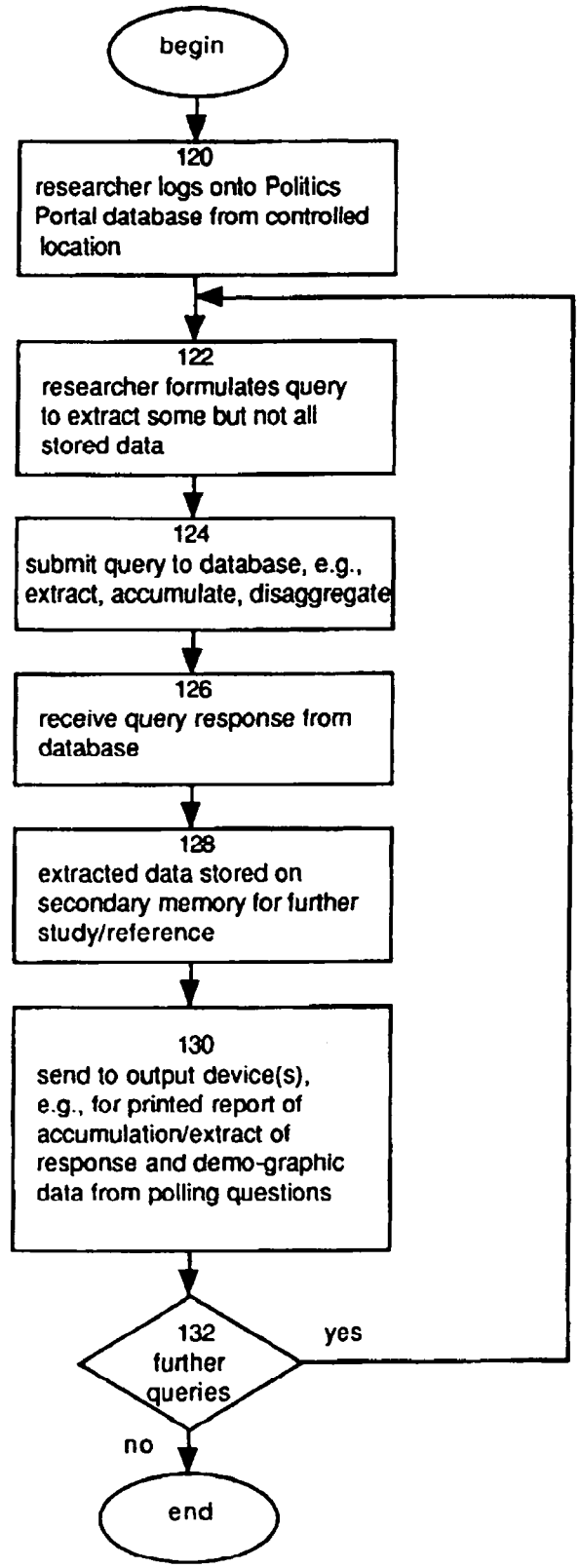
FIG. 8 is an illustration of a flow chart for an embodiment of the present invention.

In FIG. 7 the process for converting the polling data received on the Web Server for polling denoted 36 and forwarded to the Back Office database and query processor denoted 38 is described. In FIG. 8 the process by which the operator of a Researcher Computer denoted 42 is able to analyze data contained in the Pseudonymous Polling Database denoted 40 by way of the Back Office database and query processor denoted 38 is described.

Turning now to FIGS. 3 and 4, for Participant registration, in Step 48 a Participant uses of a Computer 4, such as a Pentium-based IBM compatible and on it launches a World Wide Web browser such as Netscape Navigator. In Step 50 the Participant types the web address of the Certification Authority into the browser via a link such as a Secure Sockets Layer (SSL) connection so that the remainder of the interaction between the Participant and the Certification Authority is protected against eavesdropping completing in Step 64.

The Certification Authority Web Server 36 presents a new user registration page into which the Participant enters demographic data such as age, gender, party, income, race, etc., which is subsequently transmitted to the Certification Authority Web Server 36 in Step 52. Similarly in Step 54 the Participant enters data that will confirm the Participant's claimed identity such as bank cards, charge cards, driver's license, etc., which is subsequently transmitted to the Certification Authority Web Server 36 and received in Step 66. In Step 56 the Participant will generate a public key pair, which is subsequently received by the Certification Authority Web Server 36 in Step 68.

In Step 70 the Certification Authority reformats the data received from the Participant into a suitable query to verification agents external to the Certification Authority such as databases of driver's license name to number lists, credit card authorization 110 services and banking identity systems and submits this query in Step 72. This submission may be in real time in which case this verification step and the reflection of its success to the Participant's web browser is said to be online, or it may involve significant delay, batching of duplicative submissions, or other procedural steps required by said external verification agents in which case this verification step and the reflection of its success to the Participant's web browser is said to be offline.

In Step 74 the external verification check completes and returns an answer. If the external verification check fails then both the Certification Authority's web server and subsequently the Participant's web browser abort the registration process as the "no" alternatives in Steps 74 and 58 respectively.

If the external verification checks succeed then the "yes" alternative in Step 74 is taken. In Step 76 the Certification Authority creates a pseudonymous identity for the Participant. In Step 78 the Certification Authority constructs an authorization certificate under that pseudonymous identity which includes a time-stamp limiting the lifetime of the pseudonymous authorization certificate and which includes the demographic data appropriate to the Participant encrypted in a key known only to the Certification Authority and to the Polling System. The constructed pseudonymous authorization certificate is then signed by the Certification Authority in the private key of that Certification Authority and returned to the Participant in steps 78 and 60.

In Step 80 the relationship between the pseudonymous identity as given in the authorization certificate and the Participant's real identity is then stored along with the external verifiers in a secure database available only within the security perimeter enclosing the Certification Authority. Upon receipt of the pseudonymous authorization certificate the Participant stores said certificate for future use and exits the Participant's web browser completing both registration and Step 62.

Had Step 74 been offline verification at the Certification Authority then the Participant would have received the pseudonymous authorization certificate at a subsequent visit to the Certification Authority's web server and not as part of a single interactive session with the Certification Authority's web server. To reconnect to the Certification Authority's web server as if a single continued session can be done by any of the several means now available for introducing a session continuation semantic into a web browsing session such as a persistent "cookie" transmitted from the Certification Authority's Web Server 36 to the Participant's web browser prior to the hiatus for external verification.

Turning now to FIGS. 5 and 6, for Participant polling, in Step 82 a Participant obtains the use of a computer such as a Pentium-based IBM compatible and on it launches a World Wide Web browser such as Netscape Navigator. In Step 84 the Participant clicks to or enters the web address of the polling area of the Politics Portal web server into the browser via a link such as a Secure Sockets Layer (SSL) connection so that the remainder of the interaction between the Participant and the Certification Authority is protected against eavesdropping completing in Step 94.

In Step 86 the Participant sends the pseudonymous authorization certificate as originally received in Step 60 to the Web Server 36, e.g., the polling area of the Politics Portal web server where it is received in Step 96. In Step 98 the polling area of the Politics Portal web server displays polling question #1 which is received and responded to by the Participant through his or her web browser in Step 88 such as by encoding the Participant's reply in the eXtensible Markup Language (XML). Also in Step 88 the Participant signs reply to polling question #1 and returns the signed reply to the polling mechanism of the Politics Portal web server where when received it completes Step 98. In Step 100 the polling area of the Politics Portal web server displays polling question #2 which is received and responded to by the Participant through his or her web browser in Step 90 such as by encoding the Participant's reply in the extensible Markup Language (XML). Also in Step 90 the Participant signs his or her reply to polling question #2 and returns the signed reply to the polling mechanism of the Politics Portal web server where when received it completes Step 100.

The Participant will then close his or her connection to the polling area of the Politics Portal thereby completing Step 92. In Step 102 the polling mechanism of the Politics Portal web server will forward asynchronously all the data received in Steps 98 and 100 to the Politics Portal's Back Office operation thereby completing Step 102 and entering Step 104.

FIG. 7 shows a flow chart for processing received polling data with the Back Office Computer System 38, in cooperation with researcher Computers 42. When data forwarded in Step 102 is received at the Back Office 38 in Step 104 there may have been no or a significant delay and data may be received one Participant at a time or in batch mode. From this point forward the flow chart presumes a single Participant record.

In Step 106 the polling mechanism of the Politics Portal will compare the certificate's pseudonymous identity claim against the signature on the data received in Steps 98 and 100. If the signature is not confirmable the "no" branch from Step 106 will result in an abort operation and the particular Participant's reputed response will be discarded. If the signature ostensibly placed by the Participant in Steps 88 and 90 do confirm, the "yes" branch from Step 106 will be taken.

In Step 108 the Back Office 38 process will re-format the data received in Step 104. In Step 110 the Back Office 38 will test whether for this particular Participant there is a prior record of a polling response. If there is a prior response, the "yes" branch from Step 110 will be taken for repeat polling and in Step 112 the new response will overwrite the old response this Participant put in previously. If there is no prior response, the "no" branch from Step 110 will be taken and in Step 114 the new response will be stored de novo. Whether new or repeat, the database entries will be encrypted in Step 116 and then stored in Step 118 on memory media.

FIG. 8 shows a flow chart for correlating demographic data with polling data. In Step 120 a qualified Researcher logs onto the polling database of the Politics Portal's web site 36 from a controlled location. In Step 122 the Researcher formulates a query to extract some but not all the stored data and submits this query in Step 124 so as to extract, to accumulate, to disaggregate, etc., the data stored there.

In Step 126 the response is received from the Politics Portal database and presented to the Researcher who may subsequently choose that it be stored on secondary media for future reference. The Researcher may also choose to send the data received in Step 126 to printed reports of accumulation or extraction of polling data and demographic data.

If the Researcher has further queries then flow exits Step 132 via the "yes" branch leading to further queries via Steps 122, et seq. If there are no further queries, the "no" branch is taken thereby completing Step 132.

While a particular embodiment of the present invention has been disclosed, it is to be understood that various different modifications are possible and are within the true spirit of the invention, the scope of which is to be determined with reference to the claims set forth below. There is no intention to limit the invention to the exact disclosure presented herein as a teaching of one embodiment of the invention.

We claim:

1. A computer-aided method for conducting a poll with high reliability to produce a demographic profile corresponding to an accumulation of response data from encrypted identities, the method including:

for each one of a plurality of local computers, carrying out registration substeps of:

(i.) receiving an application for participant registration, the application including participant identification data and participant demographic data; and (ii.) if said application is accepted, then issuing respective registration data, including a pseudonymous identity comprised of encrypted participant identification data;

thereafter, for a portion of the local computers, carrying out polling substeps of:

(iii.) receiving digital signals over the Internet including the encrypted participant identification data and poll response data for a first question in a poll; and (iv.) responsive to said receiving of said encrypted participant identification data, preventing more than one respective response to the first question; and associating the pseudonymous identity, the response data, and the demographic data, respectively, to produce a demographic profile corresponding to an accumulation of the response data from encrypted identities.

2. The method of claim 1, wherein said polling substeps and said step of associating are carried out devoid of the participant identification data.

3. The method of claim 2, further including the step of generating a printed report including data generated from the accumulation of the response data and from the participant demographic data.

4. The method of claim 2, further including the steps of generating a report including an extract of some but not all from the group consisting of the accumulation of response data from the first question, an accumulation of response data for a second question, and the demographic data; and
storing said extract on memory media to form an article of manufacture.

5. The method of claim 2, further including the step of generating a report including data generated from the group consisting of the accumulation of response data from the first question, an accumulation of response data for a second question, and the demographic data.

6. The method of claim 2, further including the step of off line generating certificates of authorization as a portion of said registration data.

7. The method of claim 6, wherein said certificates include a periodic time limit requiring updating said demographic data.

8. The method of claim 6, wherein said demographic data cannot be modified under participant control.

9. The method of claim 2, wherein said steps of carrying out the polling substeps, and said associating the encrypted identification data, the response data, and the demographic data to produce a demographic profile, do not include accessing said participant identification data.

10. The method of claim 2, wherein said step of receiving digital signals over the Internet including the encrypted identification data and data representing the polling data for a first question in a poll is computed asynchronously to computing for said step of preventing more than one response on the question for the corresponding registration.

11. The method of claim 10, wherein said step of preventing more than one response on the question for the corresponding registration includes allowing over-writing a prior response.

12. The method of claim 2, wherein said step of receiving from one of said computers an application for registration is carried out with said demographic data including a data set of at least three members from the group consisting of residence, age, gender, party, income, and race.

13. The method of claim 2, wherein said step of receiving from one of said computers an application for registration is carried out with said demographic data including a data set of at least two members of the group consisting of residence, age, gender, party, income, and race, and said members are verified in determining if said application is accepted, said members verified by checking at least one source from the group consisting of a charge card, a debit card, a bank card, and a drivers license.

14. The method of claim 2, wherein said step of receiving digital signals over the Internet including the encrypted participant identification data is made verifiable by using a public key cryptographically-based digital signature.

15. The method of claim 2, further including the steps of generating a private key and a public key pair, and associating the public key with the demographic data and generating a respective participant client-side certificate.

16. The method of claim 2, further including the step of cross-certifying an issuer of certificates for participant authentication.

17. The method of claim 2, wherein said substeps of receiving an application for participant registration, and issuing respective participant registration data are carried out with a certifying authority computer system; and wherein said sub step of receiving digital signals over the Internet is carried out by a politics portal web site, and further including the step of communicating said participant registration data from said certifying authority computer system to a computer system in communication with said politics portal web site.

18. The method of claim 2, wherein said step of receiving digital signals over the Internet including the encrypted participant identification data and data representing response data includes receiving a response as a signed XML construct providing the pseudonymous identity.

19. The method of claim 2, further including the step of disaggregating said accumulation of the response data in accordance with a portion of said demographic data to produce the demographic profile.

20. The method of claim 2, further including the step of providing equivalent computer systems for carrying out the step of receiving the digital signals over the Internet, said equivalent computer systems communicating to form the accumulation of response data.

21. The method of claim 2, further including the step of receiving digital signals over the Internet from a participant including signals triggering a voiding of the corresponding prior response data for the first question in a poll.

22. The method of claim 2, wherein further including the step of encrypting a database formed by carrying out said step of associating.

23. The method of claim 2, wherein further including the step of forming a data structure mapping a database formed by carrying out said step of associating, said data structure mapping the database to consistently form a pattern of data types.

24. The method of any one of claims 1–23, wherein the step of issuing respective registration data, including encrypted participant identification data, includes issuing a schema including said participant demographic data.

25. The method of any one of claims 1–23, further including the step of providing duplicative electronic pathways for carrying out the step of receiving digital signals over the Internet.

26. The method of any one of claims 1–23, further including linking a remotely mirrored logging facility to a host computer carrying out said step of receiving of said encrypted participant identification data; and providing said host computer with redundant power and redundant internet feeds.

27. The of claim 1, wherein said issuing respective registration data includes issuing respective registration data as an electronic message for storing in a browser.

28. The of claim 27, wherein said issuing respective registration data includes issuing respective registration data into memory of a smartcard.

29. The of claim 1 wherein said issuing respective registration data includes issuing respective registration data into memory of a smartcard.

30. A method for high reliability communication of demographic data from encrypted identities, the method including:
(i.) certifying, by computer, a plurality of respective registrations by substeps including:
receiving a plurality of respective participant registration applications including respective participant identification data and participant demographic data; and
for any respective one of said applications accepted for authorization, issuing respective registration data, including a pseudonymous identity comprised of encrypted participant identification data and encrypted participant demographic data; and
(ii.) using, by computer, said registration data in substeps of:
respectively receiving said registration data and query-responsive digital signals; and
associating, by computer, said pseudonymous identity respectively with said registration data and said query-responsive digital signals in producing an accumulation such that it is not possible to directly associate said participant identification data with either said registration data or said query-responsive digital signals.

31. A machine for conducting a poll with high reliability to produce a demographic profile corresponding to an accumulation of response data from encrypted identities, the machine including:
a certifying authority digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation, the processor being programmed to control the apparatus to receive the input data and to produce the output data by steps including:
(i.) carrying out registration substeps of:
receiving a participant registration application including participant identification data and participant demographic data; and
if said application is accepted, then issuing respective registration data, including a pseudonymous identity comprised of encrypted participant identification data; and
(ii.) a back office and research computer system programmed to control carrying out polling substeps of:
receiving digital signals over the Internet including the encrypted participant identification data and poll response data for a first question in a poll; and
responsive to said receiving of said encrypted participant identification data, preventing more than one respective response to the first question; and
associating pseudonymous identity, the response data, and the demographic data, respectively, to produce a demographic profile corresponding to an accumulation of the response data from encrypted identities.

32. The of claim 28, wherein said issuing respective registration data includes issuing respective registration data as an electronic message for storing in a browser.

33. A method for making machine for conducting a poll with high reliability to produce a demographic profile corresponding to an accumulation of response data from encrypted identities, the method including the steps of:
providing a certifying authority digital electrical computer apparatus including a digital computer having a processor, the processor electrically connected to a memory device for storing and retrieving machine-readable signals, to an input device for receiving input data and converting the input data into input electrical data, and to an output device for converting output electrical data into output having a visual presentation;
programming the processor being programmed to control the apparatus to receive the input data and to produce the output data by steps including:
(i.) carrying out registration substeps of:
receiving a participant registration application including participant identification data and participant demographic data; and
if said application is accepted, then issuing respective registration data, including a pseudonymous identity comprised of encrypted participant identification data; and
(ii.) providing a back office and research computer system programmed to control carrying out polling substeps of:
receiving digital signals over the Internet including the encrypted participant identification data and poll response data for a first question in a poll; and
responsive to said receiving of said encrypted participant identification data, preventing more than one respective response to the first question; and
associating pseudonymous identity, the response data, and the demographic data, respectively, to produce a demographic profile corresponding to an accumulation of the response data from encrypted identities.

34. The of claim 33, wherein said issuing respective registration data includes issuing respective registration data as an electronic message for storing in a browser.

35. The of claim 33, wherein said issuing respective registration data includes issuing respective registration data into memory of a smartcard.

* * * * *